United States Patent [19]
Ikegame

[11] Patent Number: 5,414,680
[45] Date of Patent: May 9, 1995

[54] APPARATUS WITH A COMPACT CONFIGURATION FOR SUPPORTING AN OPTICAL PICK UP DEVICE

[75] Inventor: Tetsuo Ikegame, Hachioji, Japan

[73] Assignee: Olympus Optical Co., Ltd., Tokyo, Japan

[21] Appl. No.: 925,731

[22] Filed: Aug. 7, 1992

[30] Foreign Application Priority Data

Aug. 16, 1991 [JP] Japan .................................. 3-229753
Oct. 8, 1991 [JP] Japan .................................. 3-260680

[51] Int. Cl.⁶ .............................................. G11B 7/12
[52] U.S. Cl. ........................ 369/44.14; 369/44.15; 369/44.24; 369/44.23; 359/813
[58] Field of Search ............... 369/44.14, 44.15, 44.16, 369/44.22, 44.23, 112, 44.24; 359/813, 814, 823, 824

[56] References Cited

U.S. PATENT DOCUMENTS 4,991,161 2/1991 Ikegame et al. .................. 369/44.15
5,126,983 6/1992 Ikegame et al. .................. 369/44.14

FOREIGN PATENT DOCUMENTS 56-77028 6/1981 Japan .
2226523 9/1990 Japan .

Primary Examiner—Georgia Y. Epps
Assistant Examiner—Muhammad N. Edun
Attorney, Agent, or Firm—Stevens, Davis, Miller & Mosher

[57] ABSTRACT

An apparatus for supporting an optical system, in which one of the springs for supporting an objective lens holder is positioned in an incident/reflected light beam extended in a direction parallel to an information recording surface of an information recording medium to close up an objective lens and the light beam, so that the apparatus as a whole can be made compact and thin in a focusing direction. Since the height of the apparatus becomes low, and the members for driving the lens holder, i.e. magnets, etc., can be arranged in an upper side of the apparatus, the moving sensitivity of the apparatus can be improved.

17 Claims, 14 Drawing Sheets

FIG_1
PRIOR ART
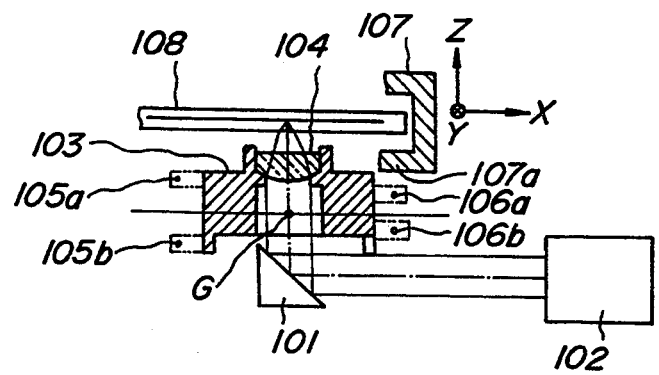
FIG_2
PRIOR ART
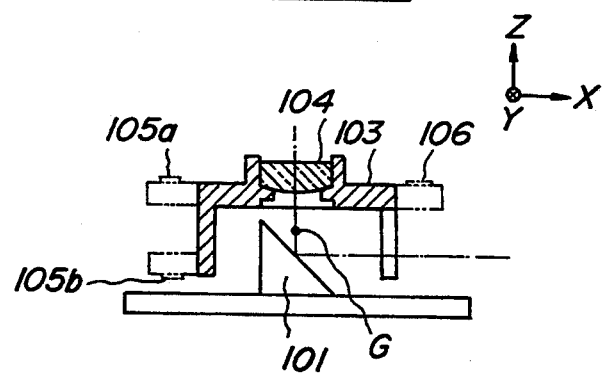

FIG_4
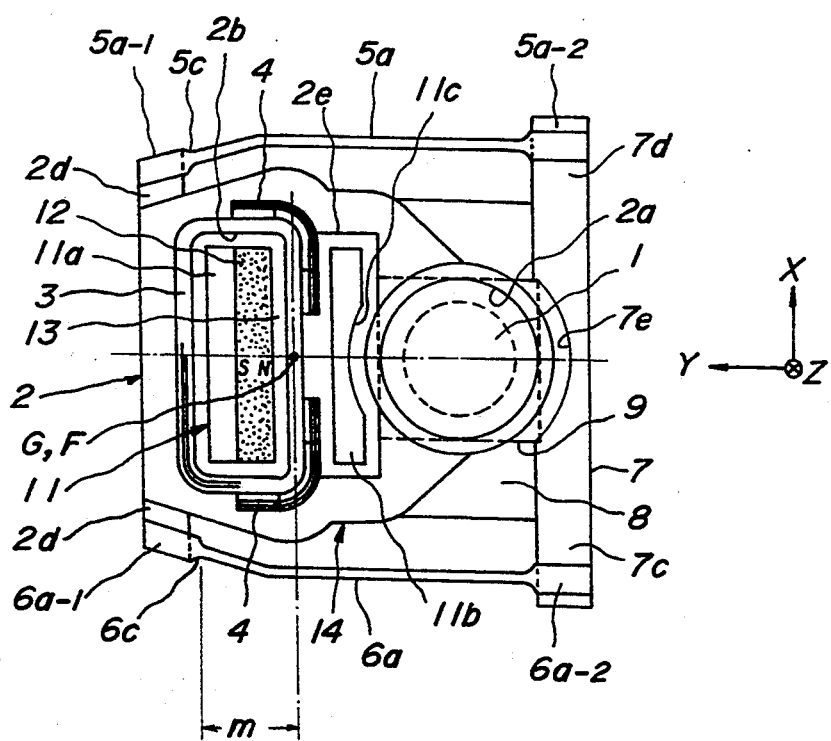

FIG_5
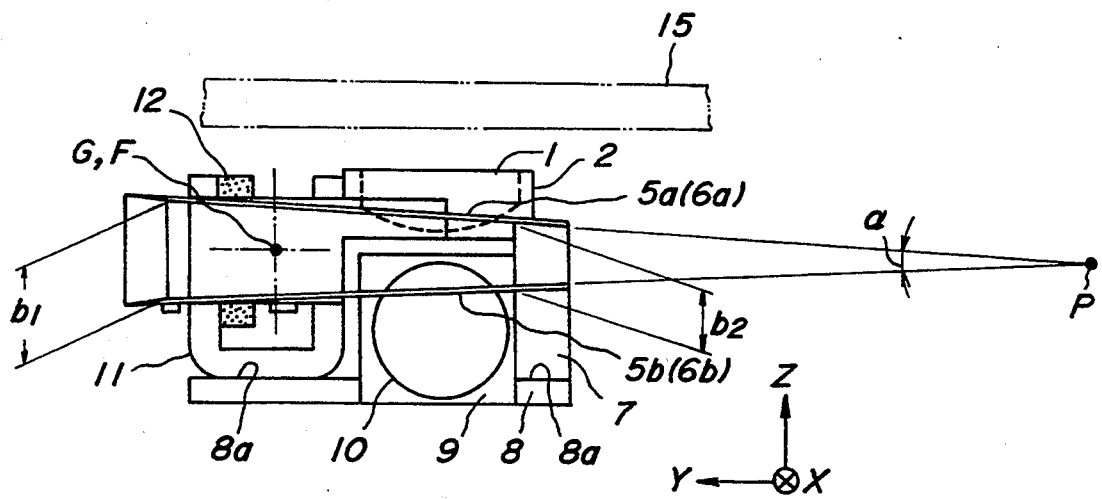

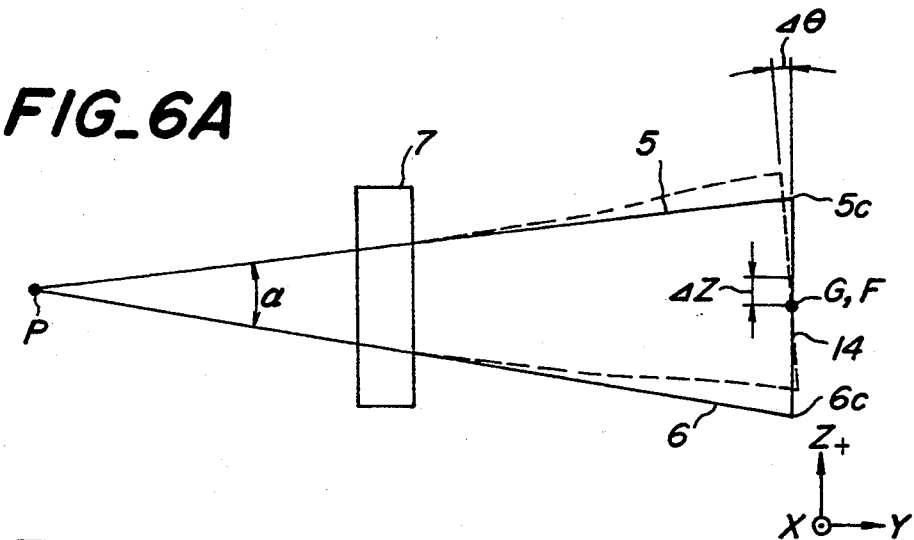
FIG._6A
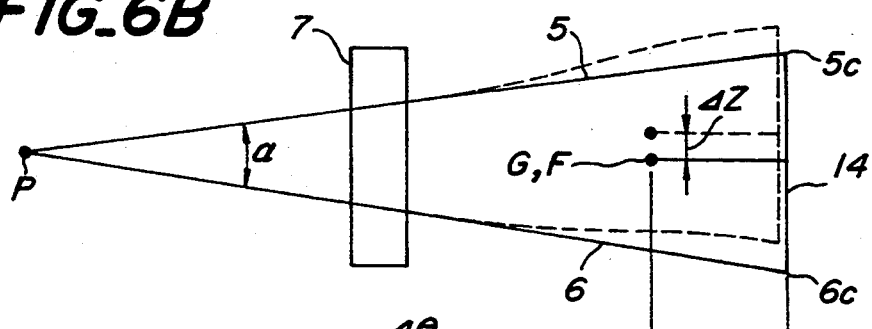
FIG._6B
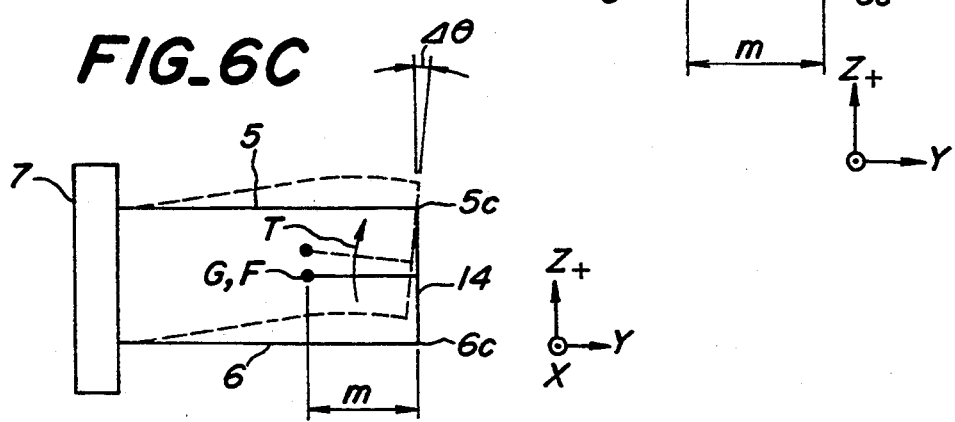
FIG._6C

FIG_7A
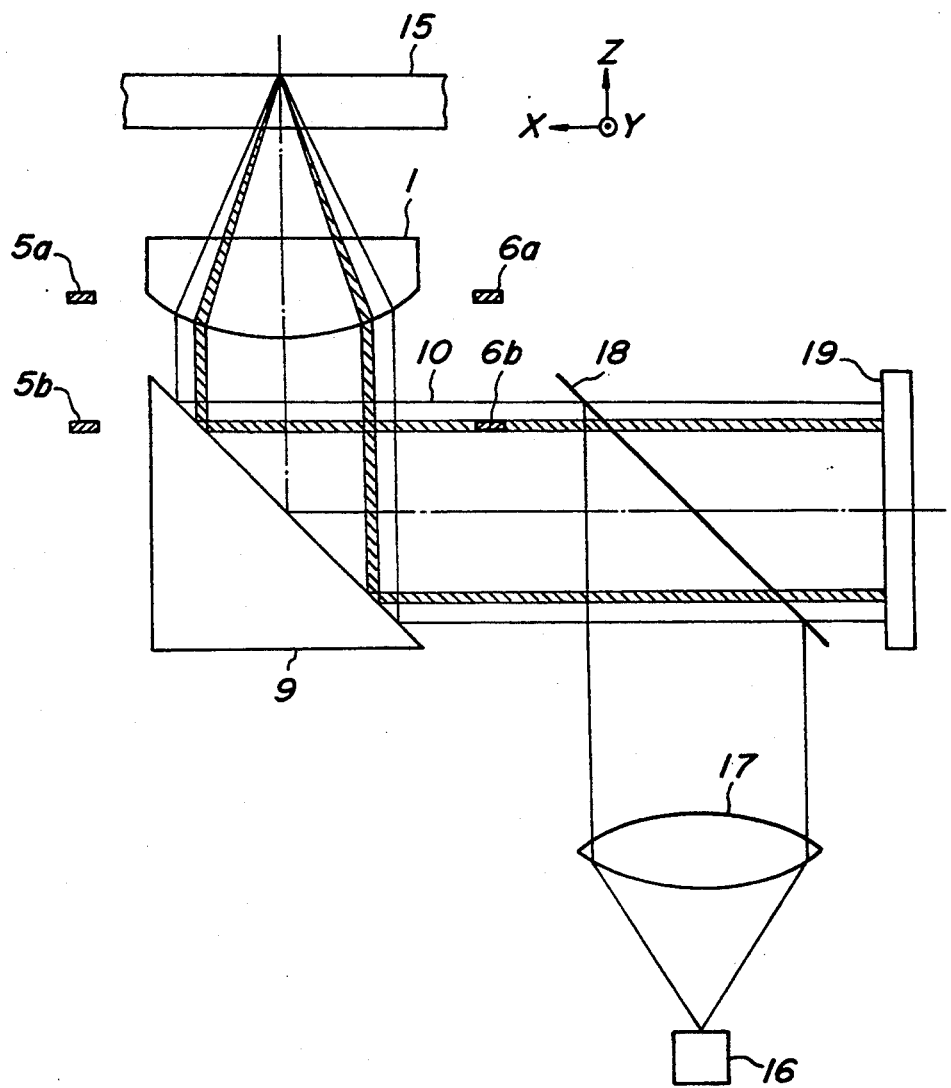
FIG_7B
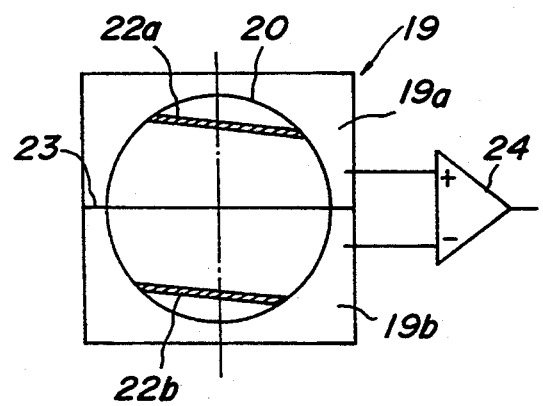

FIG_8A
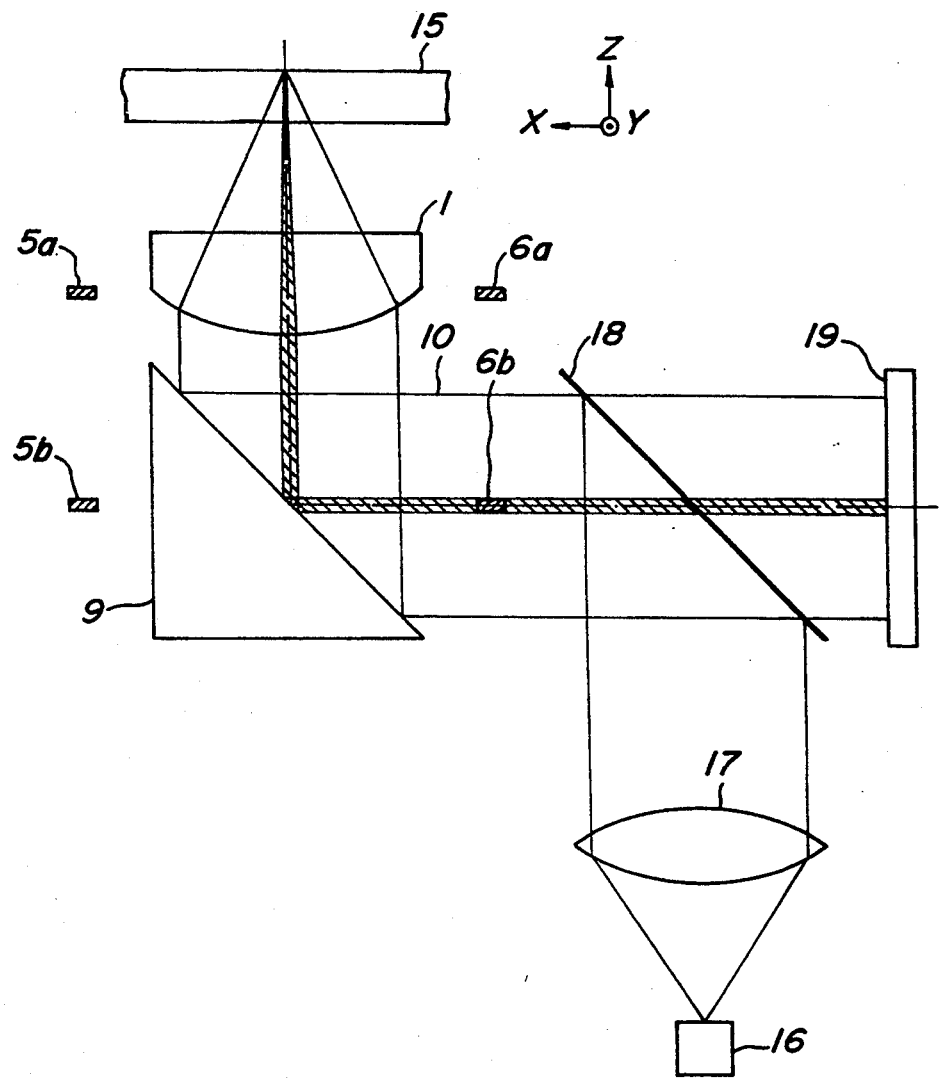
FIG_8B
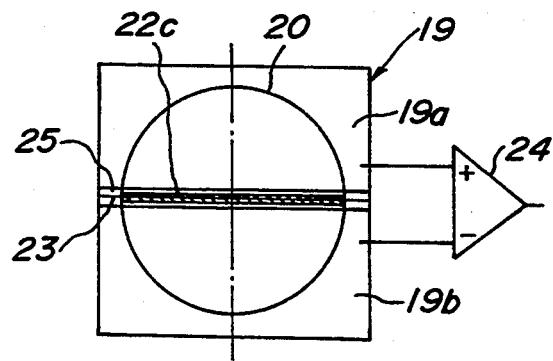

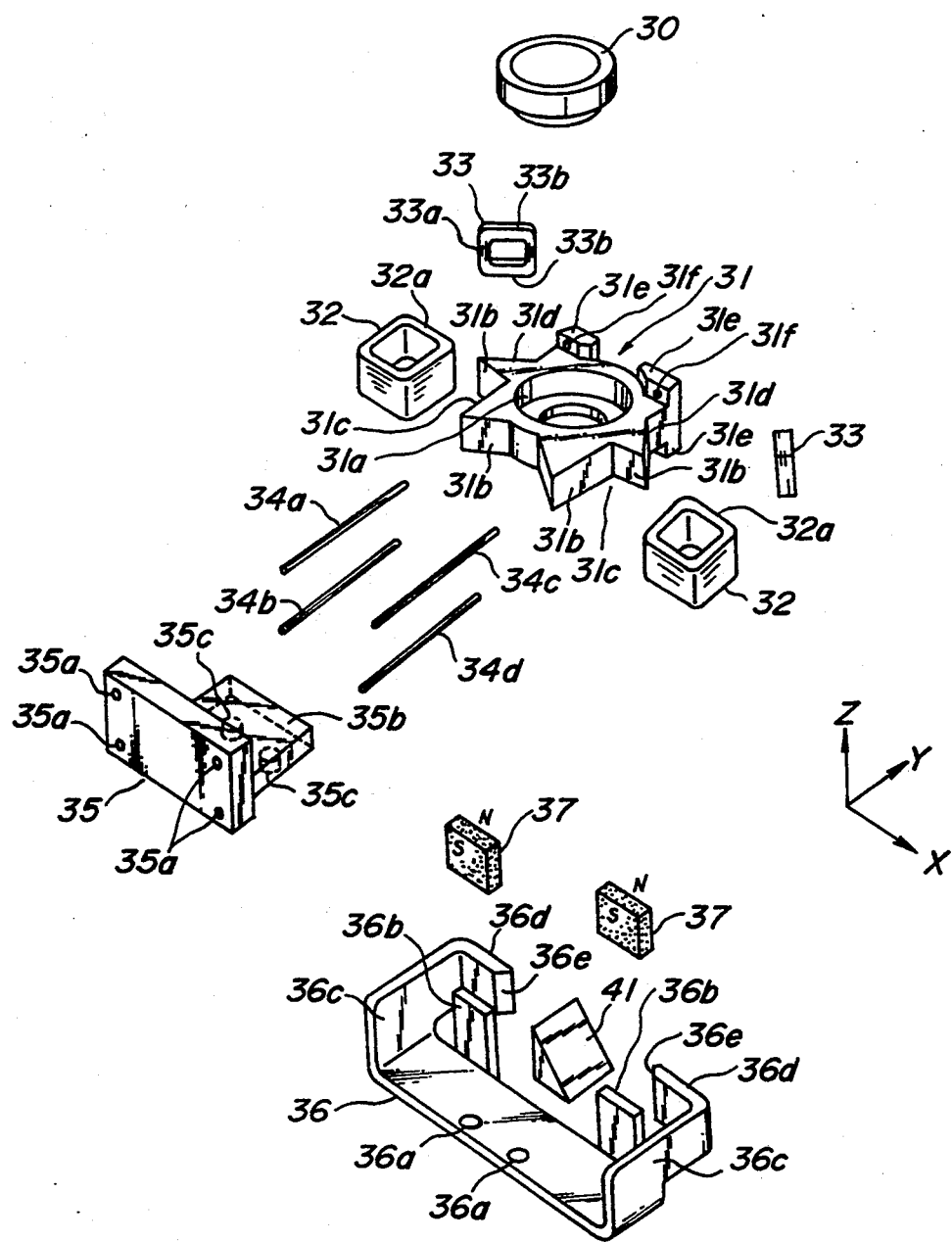
FIG_9

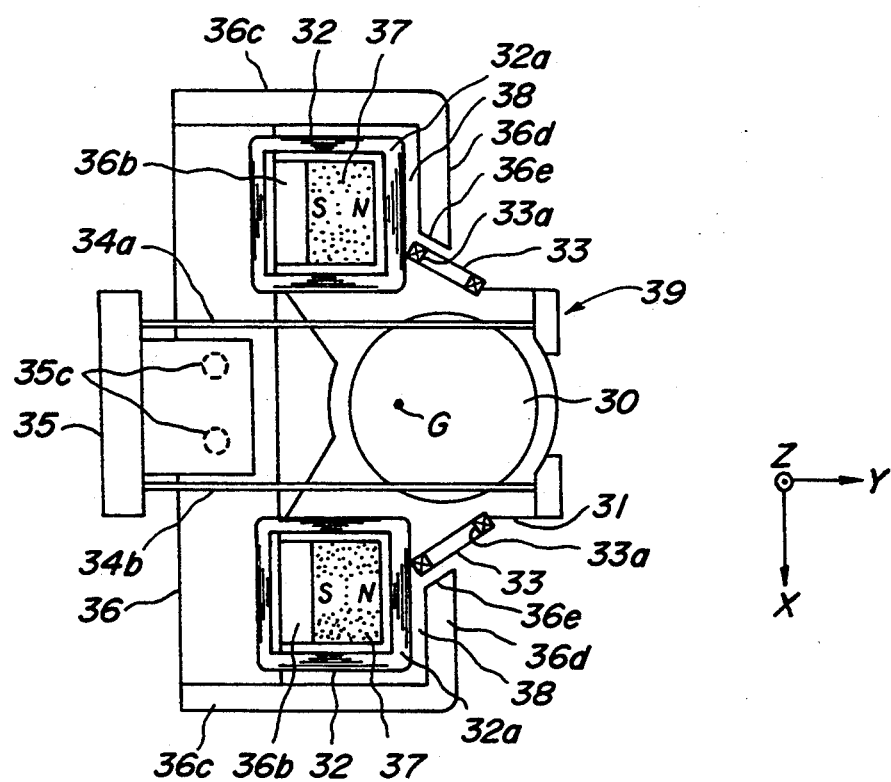
FIG_10

FIG_11
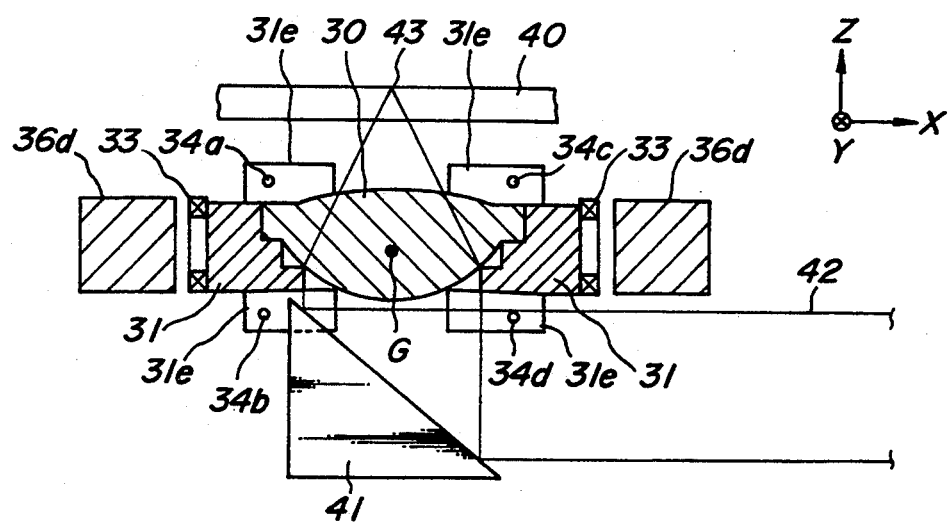

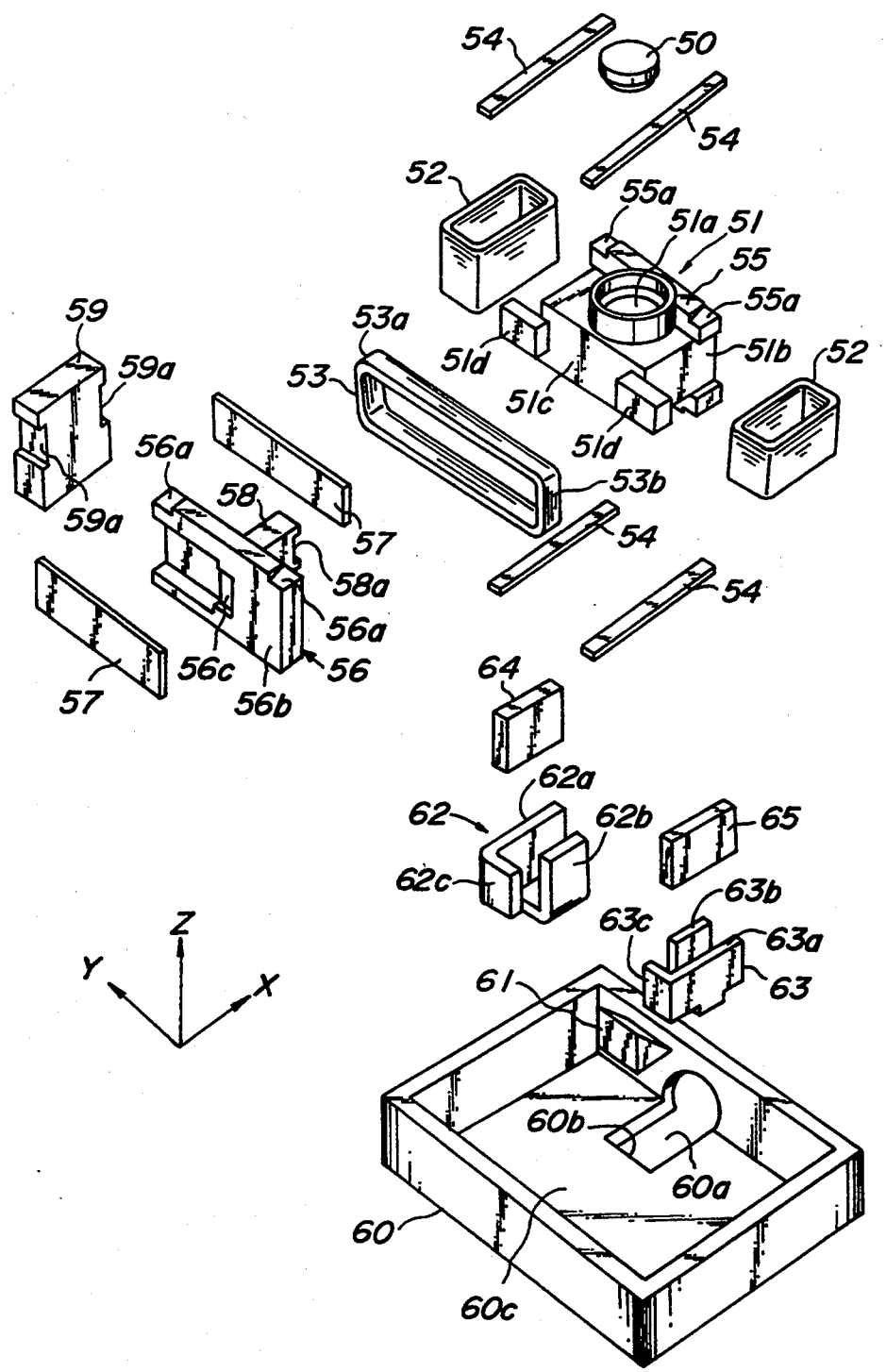
FIG_12

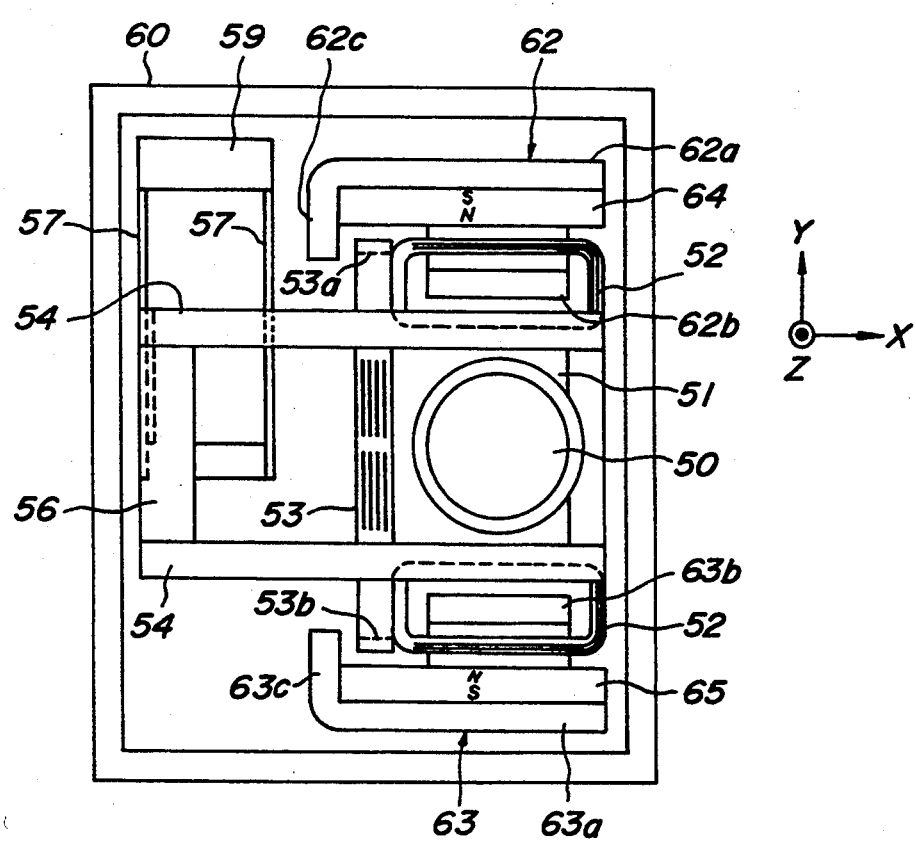
FIG_13

FIG_14
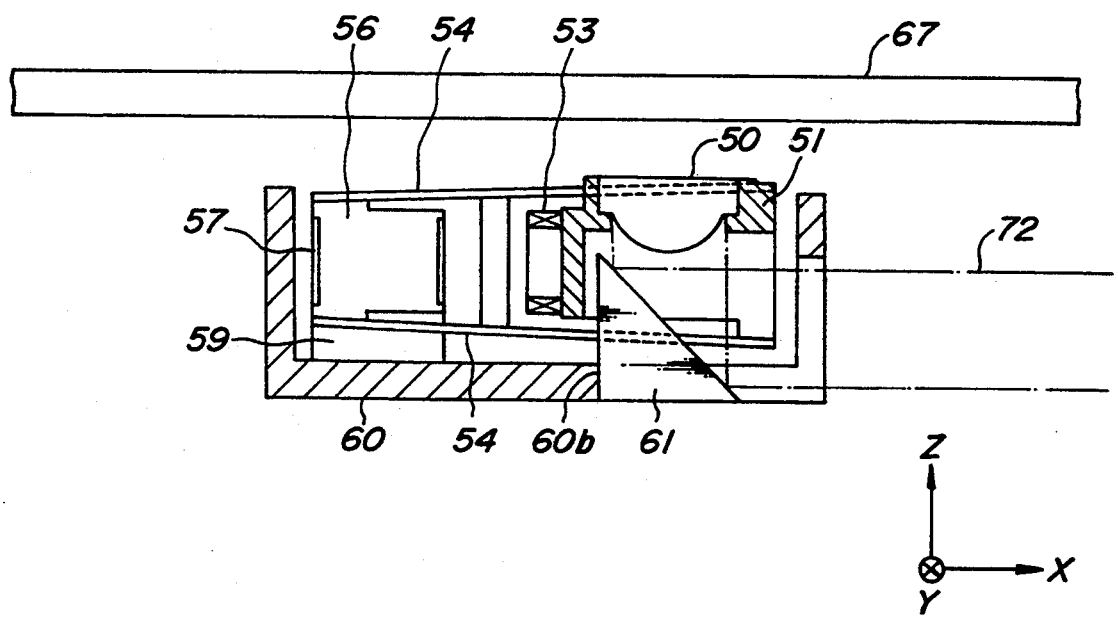

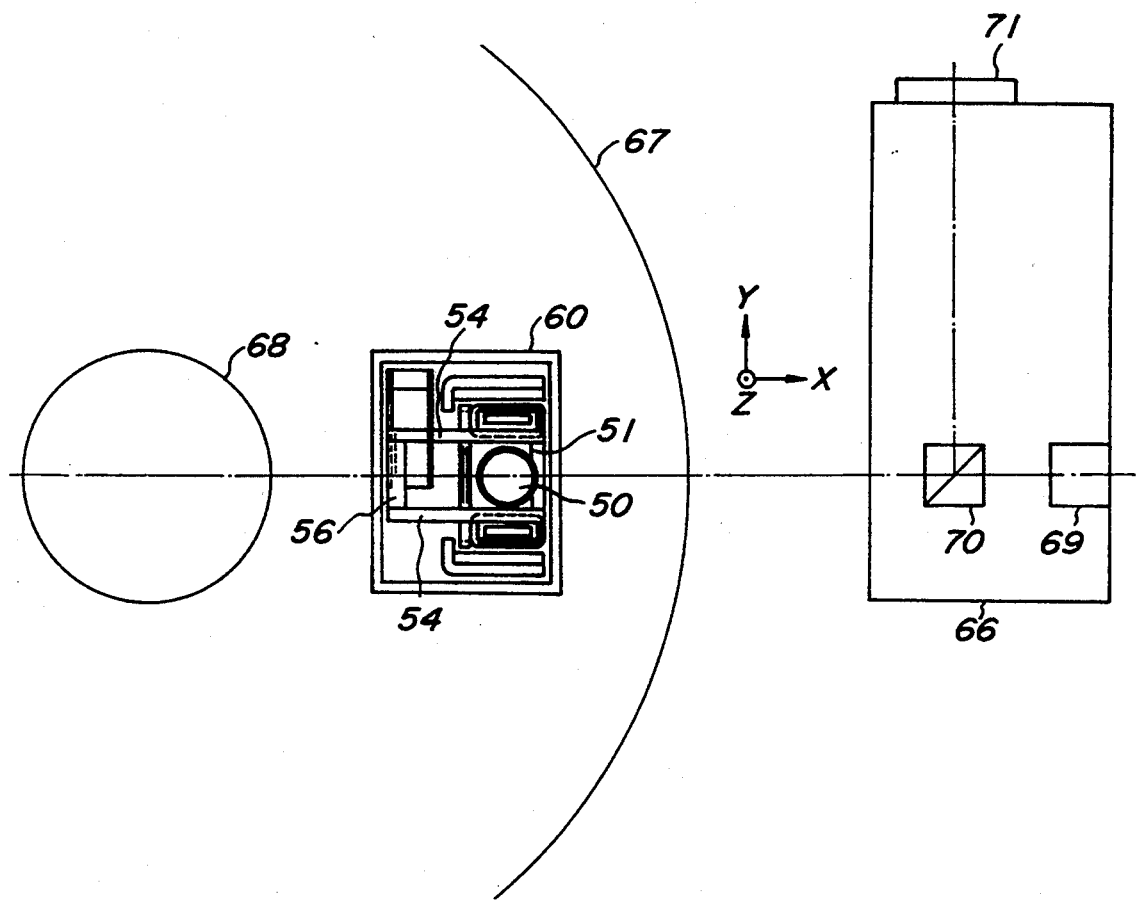
FIG_15

APPARATUS WITH A COMPACT CONFIGURATION FOR SUPPORTING AN OPTICAL PICK UP DEVICE

BACKGROUND OF THE INVENTION

1. Field of the Invention

The present invention relates to an apparatus for supporting an optical system, such as an objective lens system for converging a light beam emitted from a light source and making it incident upon an optical recording medium such, as an optical disc, in a focusing condition; the apparatus is for use in an optical information recording/reproducing apparatus.

2. Related Art Statement

Such optical pick up device is required to be made compact in size and thin in thickness. In order to make the thickness of the optical pick up device thin, such an arrangement is suggested that a mirror is arranged just under an objective lens driving means, and an optical path of a light beam being made incident upon the objective lens is changed by 90° toward the objective lens. However, in this case, it is impossible to make the thickness of the pick up device thinner than the total heights of the objective lens driving means and the mirror arranged under the objective lens driving means.

In order to make the thickness of the optical pick up device thinner, in Japanese Utility Model Preliminarily Publication No. 56-77028, an optical pick up device having such an arrangement is disclosed that an opening is formed in a center portion of a holding member for holding an objective lens; a mirror for reflecting a light beam is arranged in the opening; coils and magnetic circuits for driving the objective lens in a focusing direction are provided under the mirror; and supporting members for supporting the objective lens driving means are arranged in upper and lower sides of the mirror.

However, in such arrangement disclosed in Japanese Utility Model Preliminarily Publication No. 56-77028, since the mirror is arranged between the upper and lower supporting members, the distance between the upper supporting members and the lower supporting members should be made wider than a diameter of light bundle of the incident light beam. Further, since the lower supporting members, the coils and the magnetic circuits are arranged under the incident light beam, it is difficult to make the thickness of the optical pick up device as a whole thinner.

In order to correct this problem, the present inventors suggest a novel apparatus for supporting an optical system in Japanese Patent Preliminary Publication No. 2-226523. FIGS. 1 and 2 are schematic views showing a construction of the apparatus disclosed in the publication. As shown in FIG. 1, the mirror 101, by which the light beam emitted from an optical unit 102 is reflected toward an objective lens 104, is arranged just under a holding member 103 for holding the objective lens 104. The holding member 103 is arranged to be movable in Z direction with the aid of springs 105a, 105b, 106a and 106b, which are extended in Y direction. Further, in this apparatus, a distance between the springs 106a and 106b, which are arranged in an outer side of an optical disc cartridge 107, is designed to be smaller than the distance between the springs 105a and 105b, which are arranged in an inner side of the cartridge 107, so the distance between the objective lens 4 and the mirror 101 can be made small. In such arrangement, it is possible to make the thickness of the optical pick up device small.

Further, in Japanese Patent Preliminary Publication No. 2-226523, a modification as shown in FIG. 2 is also disclosed. In this modification, the objective lens 104 is arranged to be movable only in Z direction; and the thickness of the holding member 103 is designed to be much thinner by arranging the mirror 101 in a concave portion of the holding member 103, i.e. just under the objective lens 104. In this modification, the objective lens 104 is arranged to be movable only in Z direction with the aid of springs 105a, 105b and 106. It should be noted that only one spring 106 is arranged in the outer side of the cartridge 107 and the position in height of the spring 106 is almost the same as that of the objective lens 104.

However, in the conventional apparatus shown in FIG. 1, since the center of gravity of a movable member comprising the objective lens 104 and the holding member 103 is at a point G, and all of the springs 105a, 105b, 106a and 106b cannot be arranged in an upper side of the center of gravity. Therefore, the light bundle emitted from the optical unit 102, being made incident upon the mirror 101, cannot be placed in an upper side of the center of the gravity G of the movable member of the pick up device.

The other conventional apparatus shown in FIG. 2 allows to make the thickness of the optical pick up device thinner, but the objective lens 104 could move only in Z direction, so that the arrangement shown in FIG. 2 could not be applied to the apparatus, which is required to move the objective lens in focusing and tracking directions. Further, in the apparatus shown in FIG. 2 the thicknesses (Z direction) and lengths (Y direction) of the three leaf springs 105a, 105b and 106 are arranged to be the same but the width (X direction) of the spring 106 is twice of those of the springs 105a and 105b. Therefore, two kinds of leaf springs each having different spring constant are required; and thus the number of parts becomes large. Furthermore, when processing these leaf springs, the spring constants are varied due to the variation in their manufacturing process. As a result, the holding member 103 is moved with some inclination and thus a proper movement of the holding member 103 could not be realized.

SUMMARY OF THE INVENTION

The present invention is suggested in order to solve the above mentioned problems. The object of the present invention is to realize a compact and thin apparatus for supporting optical system, which is easily manufactured but serves in a proper manner.

In order to carry out the object, a first aspect of an apparatus for supporting optical system according to the present invention comprises:

a first optical element for changing a direction of an optical beam, which is emitted from a light source, from a first direction being parallel to an information recording surface of an optical information recording medium to a second direction, which is perpendicular to said information recording surface;

a second optical element for introducing said optical beam on said information recording surface of an optical information recording medium so as to make a light beam spot;

a holding means for holding said second optical element; and a supporting means for supporting said holding means so as to move it in a desired direction: wherein at least one portion of said supporting means being positioned in said optical beam extended in said first direction to close up said optical beam extended in the first direction with respect to the second optical element.

A second aspect of the apparatus according to the invention comprises:

a first optical element for changing a direction of an optical beam, which is emitted from a light source, from a first direction being parallel to an information recording surface of an optical information recording medium to a second direction, which is perpendicular to said information recording surface;

a second optical element for introducing said optical beam on said information recording surface of an optical information recording medium so as to make a light beam spot;

a holding means for holding said second optical element; and a supporting means for supporting said holding means so as to move it in a desired direction: wherein at least one portion of said supporting means is positioned between said second optical element and the information recording surface of the optical information recording medium to close up said optical beam extended in the parallel direction with respect to the second optical element.

A third aspect of the apparatus according to the invention comprises:

a first optical element for changing a direction of an optical beam, which is emitted from a light source, from a first direction being parallel to an information recording surface of an optical information recording medium to second direction, which is perpendicular to said information recording surface;

a second optical element for introducing said optical beam on said information recording surface of an optical information recording medium so as to make a light beam spot;

a holding means for holding said second optical element; and a supporting means for supporting said holding means so as to move it in a desired direction:

said focusing coils are arranged on side surfaces of said holding means; and one portions of said focusing coils are arranged in magnetic gaps formed between said yokes arranged around the focusing coils and magnets arranged to be faced to said yokes; and said light beam extended in said first direction is arranged just under one of said yokes.

A fourth aspect of the apparatus according to the invention comprises:

a first optical element for changing a direction of an optical beam, which is emitted from a light source, from a first direction being parallel to an information recording surface of an optical information recording medium to a second direction, which is perpendicular to said information recording surface;

a second optical element for introducing said optical beam on said information recording surface of an optical information recording medium so as to make a light beam spot;

a holding means for holding said second optical element; and a supporting means for supporting said holding means so as to move it in a desired direction: wherein an optical path of said optical beam being arranged between said first optical element and a fixed optical system, which is arranged to be separated from said first optical element and is provided with said light source; said optical path being extended in said first direction; and one end portion of said supporting means is fixed to said holding means and said supporting means is extended so as to be opposite to said fixed optical system in said first direction.

By the constructions according to the present invention mentioned in the above, the device becomes small in size and thin in thickness, and also can be easily manufactured but serves in a proper manner.

BRIEF DESCRIPTION OF THE DRAWINGS

FIG. 1 is a schematic view showing a construction of a conventional apparatus for supporting optical system;

FIG. 2 is a schematic view depicting a construction of another conventional apparatus for supporting optical system;

FIG. 4 is a plan view illustrating the construction of the apparatus shown in FIG. 3;

FIG. 5 is a side view representing the construction of the apparatus shown in FIG. 3;

FIGS. 6A, 6B and 6C are schematic views for explaining movements of springs arranged in the apparatus shown in FIG. 3;

FIGS. 7A and 7B are schematic views for explaining an optical path of an incident light beam and a light receiving condition of a photo detector arranged in the apparatus shown in FIG. 3;

FIGS. 8A and 8B are schematic views for explaining an optical path of an incident light beam and a light receiving condition of a photo detector arranged in a variation of the apparatus according to the first embodiment of the invention;

FIG. 9 is an exploded perspective view showing an apparatus for supporting optical system according to a second embodiment of the invention;

FIG. 10 is a plan view depicting the apparatus for supporting optical system shown in FIG. 9;

FIG. 11 is a cross-sectional side view illustrating the apparatus for supporting optical system shown in FIG. 9;

FIG. 12 is an exploded perspective view indicating an apparatus for supporting optical system according to a third embodiment of the invention;

FIG. 13 is a plan view representing the supporting optical system shown in FIG. 12;

FIG. 14 is a cross-sectional side view showing the apparatus for supporting optical system shown in FIG. 12; and FIG. 15 is a plan view depicting a relationship between the apparatus according to the third embodiment of the invention and the optical information recording medium.

DETAILED DESCRIPTION OF THE PREFERRED EMBODIMENTS

Figure 3:
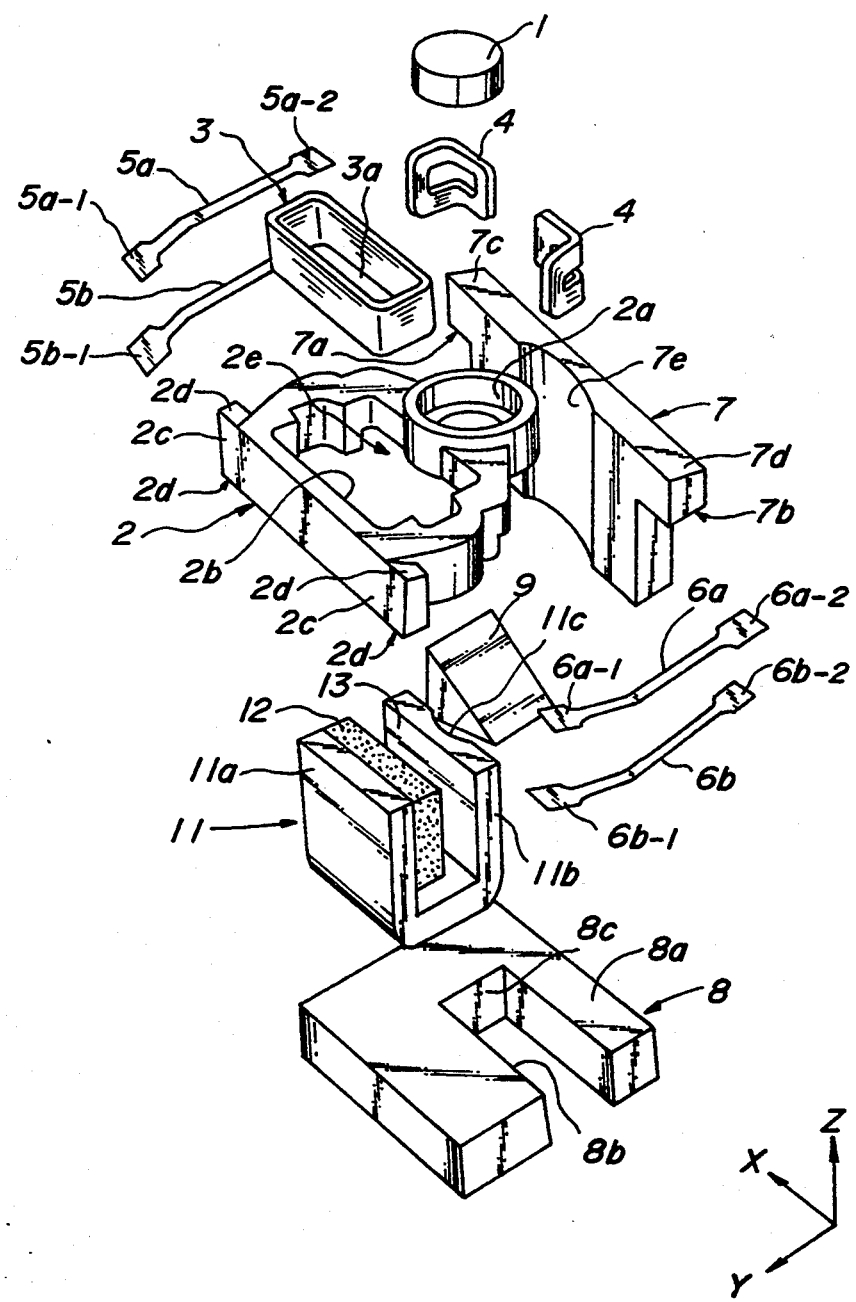
FIG. 3 is an exploded perspective view indicating a construction of a first embodiment of an apparatus for supporting optical system according to the present invention.

FIGS. 3 to 7 are schematic views showing a first embodiment of an apparatus for supporting optical system according to the present invention. FIG. 3 is a deal perspective view showing the apparatus as a whole; FIG. 4 a plan view; FIG. 5 a side view; FIG. 6 shows a movement of springs arranged in the apparatus; and FIG. 7 is a schematic view illustrating an optical system of an optical pick up, to which the apparatus is applied.

As shown in FIGS. 3 and 4, the apparatus for supporting optical system comprises an objective lens 1 and a lens holder 2, made of plastic material. In the holder 2, there are formed a first opening 2a for holding the objective lens 1 therein and a second opening 2b for fixing in which a focus coil 3 wound in a square pillared condition therein. The second opening 2b is adjacent to the first opening 2a. On corners of the focus coil 3 at the first opening side, there are further fixed tracking coils 4, which are wound in a flat square shape but bent at 90 degrees.

On one side of the holder 2, in the vicinity of the second opening 2b, convex portions 2c are provided, which are projected in X direction; and on upper and lower surfaces of the convex portions 2c, are provided sections 2d which are tapered in Y direction. To the tapered sections 2d, springs 5a, 5b, 6a and 6b are fixed, at each one end portion 5a-1, 5b-1, 6a-1, 6b-1 of springs 5a, 5b, 6a and 6b are fixed, respectively. It should be noted that each spring comprises a thin plate, made of beryllium copper, having a thickness of about 0.05 mm. Each thin plate is arranged to be small in its center portion and is covered with butyl rubber except the center portion.

Further, a fixing member 7 is provided on the base 8 in the vicinity of the first opening 2a of the holder 2. Both sides of the fixing member 7 are provided convex portions 7a and 7b in X direction; and the upper and lower surfaces of the convex portions 7a and 7b are also tapered in Z direction, and other end portions 5a-2, 5b-2, 6a-2 and 6b-2 of spring 5a, 5b, 6a and 6b are fixed to the tapered portions 7c and 7d of the convex portions 7a and 7b.

As shown in FIG. 5, pairs of springs 5a, 5b (6a, 6b) are arranged such that the distances between the pairs of springs 5a and 5b (6a and 6b) in Z direction gradually becomes smaller from left side to right side ($b_1 > b_2$). These pairs of springs 5a & 5b (6a & 6b) are symmetrically arranged in X direction, so that the holder 2 is movable in X and Z directions.

The fixing member 7 is fixed to an upper surface 8a of a base 8, which is made of aluminum plate. The base 8, which comprises a recess portion 8b arranged to be deviated from a center of the base 8 in Y direction. In this recess portion 8b, is provided a mirror 9. The mirror 9 is fixed to a back surface 8c of the recess portion 8b in such a manner that the lower arranged spring 6b interrupts an incident light bundle 10, being made incident upon the surface of the mirror 9, as shown in FIG. 5.

To the upper surface 8a of the base 8, a bottom portion of a U-shaped yoke 11 is fixed so as to face to the fixing member 7. As shown in FIG. 3, inside of one of the standing portions 11a of the yoke 11, is arranged a magnet 12, which is magnetized in its thickness direction so as to form a magnetic gap 13 between the magnet 12 and the other standing portion 11b. Further, as apparent from FIG. 4, the standing portion 11a of the yoke 11 and the magnet 12 are positioned in the space 3a formed inside the focus coil 3 (see FIG. 3); and the standing portion 11b is positioned in the space 2e (see FIG. 3) formed between the holder 2 and the focus coil 3. It should be noted that the objective lens side portion of the second standing portion 11b of the yoke 11 is concave (11c) because of the swell of the objective lens 1, as well as the concave portion 7e (FIG. 3).

The movable section 14 comprising the objective lens 1, the lens holder 2, the focus coil 3 and the tracking coil 4 is designed such that the center of gravity G and the center F of a driving force generated in the focus coil 3 in the focus direction are coincident with each other, as indicated in FIGS. 4 and 5.

As shown in FIG. 4, the end portions 5c, 6c of the springs 5a and 6a (springs 5b and 6b are not shown in FIG. 4) fixed at the holder side are deviated from the center F of the driving force in the focus direction by the length m in Y direction. Further, as stated in the above, the springs 5a, 5b, 6a and 6b are arranged such that the distance b1 between the upper and lower springs 5a and 5b (6a and 6b) at the holder side is larger than the distance b2 at the fixed member 7 side. Therefore, the upper and lower springs 5a and 5b (6a and 6b) are not arranged to be parallel to each other but to form an angle α as shown in FIG. 5.

It should be noted that the numerical reference 15 represents a disc, which is arranged in an upper side of the objective lens 1 and indicated by a dashes and dotted line in FIG. 5.

The operation of the apparatus according to the first embodiment will be stated in the following. When electric current is supplied to the focusing coil 3, a force is generated in the focus direction with the aid of the electric current and the magnetic gap 13; and the force is transmitted to the springs 5a, 5b, 6a, 6b via the holder 2 and then the springs are deformed to move the movable section 14 in the focus direction. When electric current is supplied to the tracking coil 4, the movable section 14 is moved in the tracking direction in the same manner.

Further, the movement of the movable section 14 in the focusing direction will be explained in more detail, referring to FIGS. 6A. to 6C. It should be noted that FIG. 6A does not show the apparatus according to the present invention but an apparatus arranged such that the center of gravity G, and the center F of the driving force are positioned on a line drawn between the fixed end portions 5c, 6c of the springs 5a, 6a. Since the upper and lower springs 5 and 6 are not arranged to be parallel with each other but the extended lines of these springs are crossed to form an angle α, when the movable section 14 is moved in Z+ direction (upper direction in FIGS. 6A to 6C) by Δz, the springs 5 and 6 are rotated about a cross point P of the extended line of the springs 5 and 6, so that the movable section 14 is inclined with respect to the fixing member 7 side by Δθ.

Contrary to this, in the present invention, the apparatus is arranged such that the center of gravity G and the center F of the driving force of the movable section 14 in the focusing direction is deviated from the line drawn between the fixed portions 5c and 6c of the springs 5 and 6 fixed to the fixing member 7 by a distance m. Therefore, the movable section 14 is properly moved in Z direction without being inclined with respect to the fixing member 7.

However, even if the apparatus is arranged such that the center of gravity and the center of of the movable section 14 is deviated from the line, and the springs 5 and 6 are arranged to be parallel to each other, the movable section 14 is not properly moved in Z direction as shown in FIG. 6C. That is to say, when the movable section 14 is moved in Z+ direction (upper direction), a moment T is generated about the fixed end portions 5c and 6c as shown by an arrow T in FIG. 6C, so that the movable section 14 is rotated about an X axis by $\Delta\theta$. In the same manner, when the movable section 14 is moved in Z− direction (lower direction), the movable section 14 is rotated in a reversed direction.

The rotated amount $\Delta\theta$ of the movable section 14 can be obtained by the following formula:

$$\Delta\theta = \Delta Z \cdot k \cdot m / k_1$$

wherein: when k represents a total spring constant of the springs 5 and 6, and k1 represents a spring constant when the movable section 14 is rotated about X axis, $\Delta\theta = T/k_1$, $T = F \cdot m$ and $F = \Delta Z \cdot k$ Therefore, in this embodiment, the movable section 14 is moved in a synthesized direction the moving directions mentioned in FIG. 6A and 6C, so that the movable section 14 is not inclined with respect to the fixing member 7. Of course, when the movable section 14 of the present embodiment is moved in Z− direction (lower direction), the movable section 14 is not inclined.

As a result, in order to prevent the inclination of the movable section 14, as shown in FIG. 6B, the springs 5 and 6 may be arranged to satisfy the condition that the angle $\alpha$ formed between the springs 5 and 6 cancels the inclination of the movable section 14 with respect to the values of k, m, and $k_1$.

The operation of the movable section 14 in a tracking direction will be explained in the following. In the tracking direction, the center F of the driving force of the movable section 14 is displaced from the fixed end portion of the springs, but the springs are arranged such that the distance between the spring 5a and 6a (5b and 6b) at the fixing member 7 side is larger than the distance at the holding member 2 side, viewed from Z direction, as shown in FIG. 4. Therefore, when the movable section 14 is moved in the tracking direction, the objective lens 1 is rotated about Z axis, but the objective lens is not inclined with respect to the surface of the disc 15.

Next, the optical path of the information recording-/reproducing apparatus, to which the apparatus according to the invention is applied, will be explained in the following, referring to FIG. 7. The light beam emitted from the laser diode 16 to Z direction passes through the collimator lens 17 and then becomes a parallel light beam; the parallel light beam changed its direction by 90 degrees to X direction by the half mirror 18. The light beam is further changed by 90 degrees to X direction by the mirror 9 and then made incident upon the objective lens 1 to be converged thereby to form a light beam spot on the information record surface of the optical disc 15.

The light beam reflected by the optical disc 15 passes through the optical lens 1 again; and then is made incident upon the photo detector 19 via the mirror 9 and half mirror 18. The light beam spot 20 formed on the photo detector 19 is shown in FIG. 7B. As stated in the above, in the light bundle 10 being made incident upon the mirror 9, there exists the spring 6b. Therefore, while the light beam goes to and returns from the optical disc 15, the light beam is interrupted twice by the spring 6b, so that two shadows 22a and 22b of the spring 6b are symmetrically formed in the light beam spot formed on the photo detector 19, as shown in FIG. 7B.

The photo detector 19 is divided into two light receiving elements 19a and 19b by a divisional line 23. The tracking error signal is detected by a push-pull method, in which a difference of output between both the light receiving elements 19a and 19b is detected therefor. In the light receiving elements 19a and 19b, there are formed shadow portions 22a and 22b of the spring 6b in a symmetrical manner. These shadow portions 22a and 22b are deviated from the divisional line 23 in a symmetrical manner, because the spring 6b is deviated from the center axis of the light beam 10 in the Z direction. Therefore, the light receiving elements 19a and 19b are effected by the shadow portions 22a and 22b, respectively, in the same manner, so almost no offset is generated in the tracking error signal.

A diameter of the incident light beam 10 is generally about 3 to 5 mm; and the thickness of the spring 6b is about 0.05 mm. Further, it should be noted that on a center portion of the spring 6b, which existed in the incident light beam 10, no butyl rubber is adhered. Furthermore, the spring 6b is positioned not on the center axis of the light beam 10 but in a peripheral portion, where the amount of the light beam is less than that on the center axis. Thus, since the light amount interrupted by the spring 6b is about several % of the whole light amount of the light beam, a large increase of the light emitting amount of the laser diode 16 is not necessary but it may be increased so as to compensate for the several % of the light amount which is interrupted by the spring 6b.

In the present embodiment, since the distance between the springs 6a and 6b in Z direction at the fixing member 7 side is arranged to be smaller than that at the holding member 2 side, as shown in FIG. 5, the spring 6b can be positioned in a peripheral portion of the light beam much more. Therefore, the loss of the light amount received by the photo detector 19 becomes smaller.

FIGS. 8A and 8B shows a modification of the first embodiment according to the present invention. The same numerical references are used for the same elements as those of the first embodiment. In this modification, the spring 6b is positioned on a center axis of the light beam 10; therefore only one shadow of the spring 6b is formed so as to be superimposed on the divisional line 23 of the photo detector 19, by which the photo detector 19 is divided into two light receiving elements 19a and 19b. The other structure is almost the same as that of the first embodiment. The photo detector 19 has a non-sensitive portion 25, from which no output is obtained, in the vicinity of the divisional line 23. Therefore, the tracking error signal can be detected from the light receiving elements 19a and 19b without being affected by the shadow portion 22c.

In the first embodiment and its modification, since the lower arranged springs 5b and 6b can be arranged in a much lower position in comparison with the conventional apparatuses, the distance between the upper arranged springs 5a and 6a and the lower arranged springs 6a and 6b becomes larger, as shown in FIG. 8A. Therefore, the torsional rigidity around Y axis of the apparatus can be made high. In the same manner, the sizes of the focusing coil 3 and the tracking coil 4 in Z direction can be made larger, so that the driving sensitivity of the moving section 14 can be improved.

FIGS. 9 to 11 are schematic views showing the second embodiment of the apparatus for supporting optical system according to the present invention. FIG. 9 is a perspective deal view of the apparatus, FIG. 10 a plan view and FIG. 11 a cross sectional view.

As shown in FIG. 9, an objective lens 30 is held in an opening 31a of a lens holder 31. The lens holder 31 has a star-like outer shape viewed from Z direction. The holder comprises projected portions 31b which are projected toward an outer circumference direction of the holder 31; and on the corners 31c formed by projected portions 31b there are provided focusing coils 32, which are wound in a square shaped manner. On the side surfaces 31d of the holder 31, are fixed tracking coils 33, whose shapes are plane square, viewed from front.

Further, there are arranged projected portions 31e, at end portions of the holder 31 in Y direction. In the projected portions 31e there are provided through holes 31f, in Y direction. In these through holes 31f, one end portions of springs 34a to 34d, which are made of metal and whose cross sections are arranged to be round, are secured, respectively. The other end portions of the springs 34a to 34d are inserted in to holes 35a formed in a stand portion of a fixing member 35, which is arranged in the vicinity of the holder 31, in order to determine the positions of these springs 34a~34d.

The four springs 34a to 34d are extended in parallel to each other and to be positioned in the upper and lower positions of the objective lens 30, so as to hold the objective lens 30 therebetween, as shown in FIG. 9. Out of the four springs 34a to 34d, the spring 34d is arranged to be positioned in an incident light beam 42, being made incident upon a mirror 41. The mirror 41 is arranged just under the holder 31.

As shown in FIG. 9, the fixing member 35 comprises a member 35b, which is extended in Y direction from an lower portion of the fixing member 35. On the lower surface of the member 35b there are provided two convex portions 35c for determining a position of the fixing member 35 with respect to a base 36. The base 36 is made of iron plate, comprising holes 36a and standing portions 36b. The fixing member 35 is fixed to the base 36 by inserting the convex portions 35c into holes 36a formed in the base 36. On the outer surface of the standing portions 36b are fixed magnets 37, which are magnetized in their thickness directions. Both end portions of base 36 in X direction are bent into Y direction, respectively, to form bent portions 36c; and both end portions of the bent portions 36c in Y direction are further bent into X direction to form bent portions 36d, respectively. The bent portions 36d are faced against the magnets 37, being separated therefrom, to form main magnetic gaps 38 as shown in FIG. 10. As apparent from FIG. 10, the standing portions 36b and the magnets 37 are positioned in an opening of the focusing coils 32, respectively. Further, both end portions of the bent portions 36d in X direction are shaped to form inclined sections 36e. The inclined end portions 36e are faced to one of the sides 33a of the tracking coils 33, being parallel to Z direction.

A center of gravity of the moving section 39, which comprises the objective lens 30, the lens holder 31, the focusing coil 32 and the tracking coil 33, exists at a point represented by the reference G. The point G is coincident with the position of a center of gravity of the objective lens 30 in Z direction and coincident with an intermediate positions of the upper springs 34a, 34c and lower springs 34b, 34d in Z direction.

Since the center of gravity G of the moving section 39 can be adjusted in Z direction by shifting the focusing coils 32, no balancer is necessary to adjust the position of the center of gravity G of the moving section 39 in Z direction. Therefore, the number of parts consisting of the apparatus becomes small and then it is possible to make the moving section 39 light in weight.

Further, since the center of gravity G of the moving section 39 is positioned at a center of the objective lens 30 in Z direction, if the moving section 39 is inclined, the light beam spot 43 formed on the optical information recording medium 40 is not moved so much. Therefore, a stable servo control can be performed.

The position of the center of gravity G of the moving section 39 in Y direction is deviated from the center of the objective lens 30, but the center of gravity G is coincident upon a position of the side 32a of the focusing coil 32 in Y direction. The sides 32a are in the main magnetic gaps 38. That is to say, the side 32a and the center of gravity G are on the same line drawn in X direction. Therefore, no balancer is necessary for balancing the moving sections 39 in Y direction; and thus the number of parts consisting of the moving section 39 becomes small and the weight of the moving section 39 becomes light.

Further, the springs 34a to 34d are positioned above and under the objective lens 30 and the lens holder 31; so that the size of the moving section 39 in X direction can be made small.

Further, since the side surface of the focusing coils 32 are surrounded by the bent portions 36c and 36d of the base 36, and the standing portions 36b and the base 36 are formed as a single body, the incident light bundle 42 is not interrupted by the base 36 and the light bundle can be positioned just under the bent portion 36d as shown in FIG. 11. Additionally, since the yokes, i.e. the standing portions 36b, bent portions 36c and bent portions 36d, and the base 36 can be formed integrally, the apparatus can be made compact and manufactured in an effective manner.

Between the magnetized surface of the magnets 37 and the bent portions 36c of the base 36, there are also formed magnet gaps. Therefore, large magnetic fluxes effect to the focusing coils 32, and then the driving sensitivity of the apparatus in the focusing direction can be improved.

Further, when the moving section 39 is moved in X direction, the magnetic fluxes effecting to the focusing coils 32 are not deviated from the focusing coils 32 so much in X direction. Therefore, only a small torque is generated on the moving portion 39 about Y axis, thus the moving section 39 is not apt to be inclined.

Furthermore, since the tracking coils 33 are not positioned between the magnets 37 and the bent portions 36d of the base 36 but at sides of top end portions 36e of the base 36 as shown in FIG. 10, gap lengths of the main magnetic gaps 38 can be made short, and then the magnetic flux density of the main magnetic gaps becomes high. Therefore, the driving sensitivity of the moving section 39 in the focusing and tracking directions can be improved.

Furthermore, the tracking coils 33 are arranged to be inclined with respect to the magnets 37, respectively, and the sides 33a of the tracking coil 33 are positioned to be faced to the end portions 36e of the base 36. Therefore, the magnetic fluxes generated from the magnets 37 are concentrated at the top end portions 36e and thus the magnetic flux densities effecting to the sides 33a of the tracking coils 33 become high. Additionally, since the tracking coils 33 can be used in a plane shaped condition, it is easy to manufacture the tracking coils and thus manufacturing efficiency can be improved.

Moreover, the direction of the magnetic fluxes effecting to the sides 33b of the tracking coil 33 is substantially parallel to the sides 33b, so that unnecessary force is not generated on the sides 33b.

FIGS. 12 to 15 show the third embodiment of the apparatus for supporting optical system according to the present invention. FIG. 12 is an exploded perspective view of the whole apparatus, FIG. 13 a plan view, FIG. 14 a cross sectional view, and FIG. 15 is a plan view showing a relationship between the apparatus and the optical information recording medium.

An objective lens 50 is fixed in an opening 51a formed in a lens holder 51. On the side surfaces 51b of the lens holder 51 in Y direction, are fixed square wound focusing coils 52, whose positions are determined by projected portions of the holder 51. Further, on the side surface 51c of the holder 51 in X direction are provided projected members 51d to determine a position of a tracking coil 53 by engaging the inner wall of the tracking coil 53 thereon.

Each focusing spring 54 comprises a leaf spring, made of metal, having its thickness of about 0.1 mm and a damper provided on the whole surface of the leaf spring. There are arranged four focusing springs 54; one end portions thereof are arranged on projected portions 55, whose surfaces 55a are inclined with respect to X-Y plane, formed on upper and lower surface of of the lens holder 51 so as to be projected in Y direction.

The other end portions of the focusing springs 54 are fixed to inclined portions 56a, formed on upper and lower surfaces of an intermediate member 56.

On the other hand, there are provided two tracking springs 57, which are extended in Y direction. Each tracking spring comprising a metal spring having its thickness of about 0.1 mm. The whole surface of the metal spring, is covered by damper. One end portions of these tracking springs 57 are fixed to concave portions 56c and 58a formed in side surfaces of the intermediate member 56 in X direction so as to be perpendicular to the extended direction of the focusing springs 54.

The other end portions of the tracking springs 57 are fixed to a fixing member 59 so as to be engaged with concave portions 59a formed in side surfaces of the member 59 in X direction. A bottom surface of the fixing member 59 is fixed to an inner side of a box-shaped carriage 60 made of plastic.

As shown in FIG. 12, in the bottom 60c and one of the side surfaces of the carriage 60 for holding the lens holder 51, etc., there is arranged an opening 60a, through which an optical path of a light beam is formed; and in the opening 60a is arranged a triangle mirror 61 in order to direct the optical path to the objective lens 50. Further, on the bottom 60c of the carriage 60, are fixed almost U-shaped yokes 62 and 63, which are made of iron. On inner sides of standing portions 62a and 63a of these yokes 62, 63, are fixed magnets 64, 65 respectively, which are magnetized in their thickness direction to form a magnetic gap between the magnet 64: 65 and standing portions 62b and 63b. End portions of the standing portions 62a and 63a are bent to Y direction, respectively, to form side yokes 62c and 63c.

Said standing portions 62b and 63b of the yokes 62 and 63 are engaged between the focusing coils 52 with some clearances, as shown in FIG. 13, but separated from sides 53a and 53b of the tracking coil 53.

One part of the magnetic flux generated from the magnet 64 is directed to the standing portion 62b of the yoke 62. The other one part of the magnetic flux generated from the magnet 64 is directed to the side yoke 62c via the side 53a of the tracking coil 53. The magnetic flux generated from the other magnet 65 acts in the same manner. Therefore, the lens holder 51 having the objective lens 50 is moved in the focusing and tracking directions by supplying electric current to the focusing coil 52 and the tracking coil 53.

As shown in FIG. 14, there is a space under the objective lens 50; and the mirror 61 is arranged in the space so as to be separated from the objective lens 50 by some distance required to move the lens holder 51 in Z direction. The focusing springs 54 are extended in X direction, but the distance between the upper springs and the lower springs at the objective lens 50 side is larger than that at the intermediate member 56 side. From such arrangement, it is possible to stabilize the action of the lens holder 51 in a focusing direction. Because, the end portions of the focusing springs 54 fixed to the lens holder 51 is deviated from a center, point of a moving force, which is added to the holder 51 in the focusing direction.

The moving section is moved in the focusing direction in the same manner as shown in the first embodiment, so the explanation therefor is omitted here.

The carriage 60 explained in the above is arranged to be movable in X direction on a deck base (not shown) via supporting and driving means, such as bearings and coils (not shown), as shown in FIG. 15. On the deck base, is fixed a fixed an optical system 66 and a motor 68 for holding and rotating the optical information recording medium 67.

An optical path 72 formed in the apparatus of the third embodiment will be explained. A light beam is emitted from a laser 69 provided in the fixed optical system 66 to be directed to the mirror 61 via a beam splitter 70; the light beam is reflected by the mirror 61 and then made incident upon the objective lens 50. The light beam passes through the objective lens and then made incident upon the optical information recording medium 67 to form a light beam spot thereon. The light beam is reflected by the medium 67 and then directed to a light receiving element 71 via the objective lens 50, the mirror 61 and the beam splitter 70 in order to detect an information signal (FIGS. 14 and 15).

In the present embodiment, the focusing springs 54 are extended into an opposite direction to the optical path 72; the intermediate member 56, on which one end portions of the focusing springs 54 are fixed, is positioned in an opposite side to the optical path 72; and the focusing springs 54 are arranged both sides of the mirror 61. Therefore, the focusing springs 54 do not interrupt the optical path 72; and The mirror 61 can be arranged just under the objective lens 50, so that the height of the apparatus in X direction can be made small in comparison with the conventional apparatus.

The focusing springs 54 are extended to the motor 68 side. Thus, it is difficult to extend the length of the springs 54 in X direction; but, since the springs 54 are arranged such that end portions of the springs 54 are fixed on the projected portion 55, which is arranged at end position of the holder 51, being the farthest from the intermediate member 56, the effective length of the focusing springs 54 can be made long. Therefore, it is possible to make the thickness of the focusing springs 54 large and thus assembling and processing of the springs become easy. Additionally, since the springs 54 are arranged such that the distance between the upper and lower focusing springs at the lens holder side is larger than that at the intermediate member side, when the holder 51 is moved in Z direction, the holder 51 is not apt to be inclined with respect to X direction.

Furthermore, in spaces formed between the magnet 64 and the standing portion 62b of the yoke 62 and between the magnet 65 and the standing portion 63b of the yoke 63, there exists only one side of the focusing coils 52 respectively. Therefore, the distances therebetween can be made small, so that the driving sensitivity of the moving section becomes high in the focusing direction.

In each of the above mentioned embodiment, the objective lens is arranged to be movable in the focusing and tracking directions, respectively, but, the present invention can be applied to the apparatus in which the objective lens is arranged to be movable only in one direction, i.e. focusing or tracking directions.

As mentioned in the above, the apparatus for supporting optical system according to the invention is arranged such that the optical system to be supported is closed to the optical path, which is extended being almost parallel to the optical information recording medium, so that the height of the apparatus can be made small. Further, the center of gravity of the moving section is arranged to be closed to the optical path, so that the heights of each coil and each magnet can be made large and thus the driving sensitivity of the moving portion can be improved.

Further, since all of the supporting members are made of the same material, the supporting members can be manufactured easy and the performances of the supporting members do not vary so much.

Further, since the upper ones of the supporting members are arranged to be positioned above the optical element, the other elements such as the magnets, can be arranged in the upper position, so that the driving sensitivity of the movable section can be improved.

Furthermore, the yokes are extended from the side portions of the focusing coils, and the yokes and the magnets are connected by the connecting members arranged not under the focus coil but side thereof, respectively. Therefore, the optical path can be arranged just under the yokes and one of the focus coils, so that the apparatus can be made compact.

Furthermore, since one end portions of the supporting members are arranged in an opposite side of the optical path and the mirror is arranged just under the objective lens, the apparatus can be made thin.

As stated in the above, according to the invention the apparatus can be made compact in size and thin in thickness, and it is possible to easily manufacture the apparatus which operates in a proper manner.

What is claimed is:

1. An apparatus for supporting an optical system comprising:
    a first optical element for changing a direction of an optical beam, which is emitted from a light source, from a first direction being parallel to an information recording surface of an optical information recording medium to a second direction, which is perpendicular to said information recording surface;
    a second optical element for introducing said optical beam on said information recording surface of an optical information recording medium so as to make a light beam spot;
    a holding means for holding said second optical element; and
    a supporting means for supporting said holding means so as to move it in a desired direction;
    at least one portion of said supporting means being positioned in said optical beam extended in said first direction to close up said optical beam extended in the first direction with respect to the second optical element;
    a reflection optical beam reflected by said information recording medium being detected by a photo detector; said photo detector comprising a divisional line; and shadows of said one portion of said supporting means being formed on the photo detector so as to be substantially symmetrical about said divisional line.

2. An apparatus for supporting an optical system according to claim 1, wherein:
    said supporting means comprises a plurality of springs, which are extended being crossed to said first direction; at least one of the springs is positioned in said light beam so as to cross the light beam extended in the first direction.

3. An apparatus for supporting an optical system according to claim 2, wherein:
    each one end of said spring is fixed to a fixing member and each of the other end of said spring is fixed to said holding means movable in a desired direction; and a distance between upper arranged springs and lower arranged springs at said holding means side is larger than that at said fixing member side.

4. An apparatus for supporting an optical system according to claim 3, wherein:
    a center of gravity G of a movable section, on which at least said second optical element, said holding means and said supporting means are arranged, of the apparatus is coincident with a center F of driving force of said movable section in said second direction.

5. An apparatus for supporting an optical system according to claim 4, wherein:
    said center of gravity G and center F of driving force are deviated from a line connecting said end portions of the upper and lower arranged springs at said holding means side by a given amount in the spring extended direction.

6. An apparatus for supporting an optical system according to claim 2, wherein:
    said springs are arranged such that a distance between the springs at said fixing member side viewed from said second direction is larger than that at said holding means side.

7. An apparatus for supporting an optical system according to claim 1, wherein said divisional line divides said photo detector into a plurality of light receiving regions which produce output signals which are used to derive a positional error signal in a push-pull mode.

8. An apparatus for supporting an optical system comprising:
    a first optical element for changing a direction of an optical beam, which is emitted from a light source, from a first direction which is parallel to an information recording surface of an optical information recording medium to a second direction, which is perpendicular to said information recording surface;

a second optical element for introducing said optical beam on said information recording surface of said optical information recording medium, said second optical element comprising means for focusing said optical beam so as to make a light beam spot;

a holding means for holding said second optical element; and a supporting means for supporting said holding means so as to move it in a desired direction;

at least one portion of said supporting means being positioned between said second optical element and the information recording surface of the optical information recording medium to close up said optical beam extended in the first direction with respect to the second optical element.

9. An apparatus for supporting an optical system according to claim 8, wherein:

said supporting means comprises a plurality of springs; each one of the springs is fixed to a fixing member and each other end of said spring is fixed to said holding means so as to support the holding means being movable in a desired directions.

10. An apparatus for supporting an optical system according to claim 9, wherein:

at least one of said springs is positioned in said light beam so as to cross the light beam extended in said first direction.

11. An apparatus for supporting optical system according to claim 9, wherein:

said springs are arranged in upper and lower sides of said second optical element;

a center of gravity of a movable section in said second direction, on which at least said second optical element, said holding means and said supporting means are arranged, is coincident with a center of gravity of said second optical element in said second direction and with an intermediate point of said upper arranged springs and said lower arranged springs in said direction.

12. An apparatus for supporting an optical system according to claim 9, wherein:

said springs are arranged in upper and lower sides of said holding member, holding said second optical element.

13. An apparatus for supporting an optical system comprising:

a first optical element for changing a direction of an optical beam, which is emitted form a light source, from a first direction being parallel to an information recording surface of an optical information recording medium to a second direction, which is perpendicular to said information recording surface;

a second optical element for introducing said optical beam on said information recording surface of an optical information recording medium so as to make a light beam spot;

a holding means for holding said second optical element;

a supporting means for supporting said holding means so as to move it in a desired direction;

focusing coils arranged on side surfaces of said holding means;

yokes having portions which extend around said focusing coils in parallel with said information recording surface; and magnets disposed so as to face parts of said portions of said yokes, portions of said focusing coils being arranged in magnetic gaps formed between said portions of said yokes and said magnets and said light beam extended in said first direction being arranged just under an entirety of said portions of said yokes.

14. An apparatus for supporting an optical system according to claim 13, wherein:

tracking coils are arranged to be perspective with respect to one of the sides of a focusing coils in said second direction.

15. An apparatus for supporting an optical system comprising:

a first optical element for changing a direction of an optical beam, which is emitted from a light source, from a first direction being parallel to an information recording surface of an optical information recording medium to a second direction, which is perpendicular to said information recording surface;

a second optical element for introducing said optical beam on said information recording surface of an optical information recording medium so as to make a light beam spot;

a holding means for holding said second optical element; and a supporting means for supporting said holding means so as to move it in a desired direction:

an optical path of said optical beam being arranged between said first optical element and a fixed optical system, which is arranged to be separated from said first optical element and is provided with said light source; said optical path being extended in said first direction; and one end portion of said supporting means being fixed to said holding means and said supporting means being extended away from said fixed optical system in said first direction.

16. An apparatus for supporting an optical system according to claim 15, wherein:

said supporting means comprises a plurality of focusing springs extended in said opposite direction, and a fixing member, on which the other end portions of said supporting means is fixed; and a distance between upper arranged springs and lower arranged springs at said holding means side is larger than that at said fixing member side.

17. An apparatus for supporting an optical system comprising:

a first optical element for changing a direction of an optical beam, which is emitted from a light source, from a first direction being parallel to an information recording surface of an optical information recording medium to a second direction, which is perpendicular to said information recording surface;

a second optical element for introducing said optical beam on said information recording surface of an optical information recording medium so as to make a light beam spot;

a holding means for holding said second optical element; and a supporting means for supporting said holding means so as to move it in a desired direction;

at least one portion of said supporting means being positioned in said optical beam extended in said first direction to close up said optical beam extended in the first direction with respect to the second optical element;

a reflection optical beam reflected by said information recording medium being detected by a photo detector; said photo detector comprising a non-sensitive portion; and a shadow of said one portion of said supporting means being formed on said non-sensitive portion.

* * * * *